UNITED STATES PATENT OFFICE.

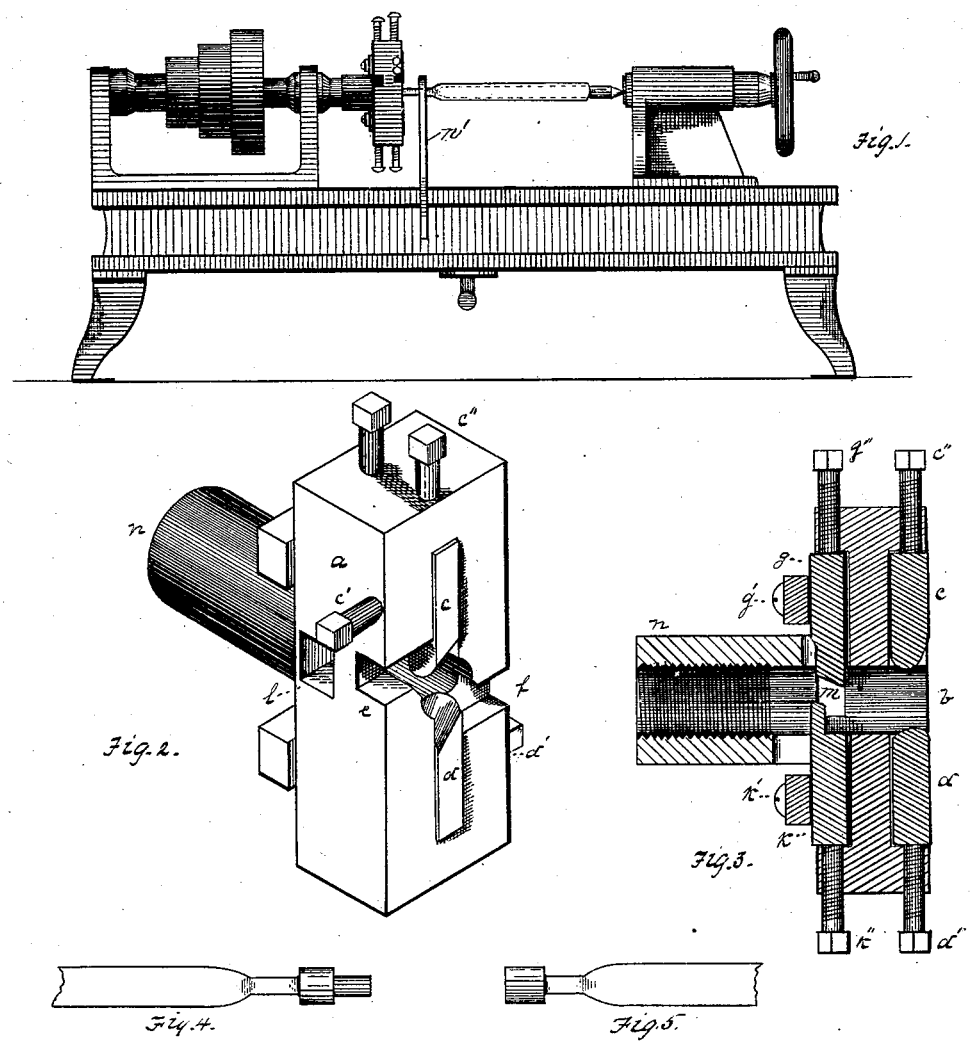

JOHN CAIN, OF PITTSBURG, PENNSYLVANIA, ASSIGNOR TO GILLESPIE BROTHERS & CO.

HEAD FOR LATHES.

SPECIFICATION forming part of Letters Patent No. 243,058, dated June 21, 1881.

Application filed March 16, 1881. (No model.)

*To all whom it may concern:*

Be it known that I, JOHN CAIN, of Pittsburg, in the county of Allegheny and State of Pennsylvania, have invented a new and useful Improvement in Heads for Lathes; and I do hereby declare the following to be a full, clear, and exact description thereof, reference being had to the accompanying drawings, forming a part of this specification, in which—

Figure 1 is a side elevation of a lathe provided with my device for turning sucker-rod joints. Fig. 2 is a perspective view of the head or device for turning sucker-rod joints detached from the lathe, and Fig. 3 is a sectional view of the same, and Figs. 4 and 5 are views of the male and female portion of a sucker-joint.

Like letters indicate like parts wherever they occur.

My invention has for its object a mechanical device for finishing the ends and collars of the box and rim of sucker-rod joints; and it consists in the combination, with a chuck or lathe head having a central axial opening, of a series of inwardly-projecting tools or cutters, one or more of the cutters being adjustable, and the several cutters relatively arranged as will hereinafter more fully appear, whereby the same tool is adapted for use in finishing both the pin and socket sections of a sucker-rod or similar joint.

Heretofore the joining portions of sucker-rod joints have been turned and finished by skilled mechanics using an engine, lathe, and hand-tools suitable for the purpose. The operation was slow and tedious, only a certain number could be completed in a day, and skilled labor had to be employed upon each joint. By my invention, however, more than double the work can be accomplished in the same time, and that by boys or other unskilled workmen, and the parts are more accurately and perfectly formed than has been possible heretofore.

I will now describe my invention so that others skilled in the art may manufacture and use the same.

In the drawings, $a$ represents my improved head, which, as shown, is rectangular in form, and is provided with a tubular opening, $b$, which passes through the middle of the same. Set in the face of the head $a$ are two chisels or tools, $c$ $d$, the cutting-edges of which project but slightly into the tubular opening $b$. These tools are secured in the head by means of the screws $c'$ $d'$ and are adjusted by means of the screws $c''$ $d''$. Passing from the cutting-edge of the tools $c$ and $d$ in the cavity $b$ are two slots or openings, $e$ and $f$, which extend to the outer surface of the head $a$. The object of these openings is to allow of the egress of the shavings and turnings cut from the sucker-rod joint. The purpose of the tools $c$ and $d$ is to turn and finish the collar on the joint. These two tools are set in the frame so that their cutting-edges project on opposite sides of the opening $b$.

In the rear face of the head $a$ are set two other tools, $g$ and $k$, secured in the head by means of the bars and screws $g'$ and $k'$. The cutting-edges of these tools $g$ and $k$ project into the tubular opening $b$, and in the head $a$ are two openings, $l$ and $m$, passing from the edge of the tools to the outer surface of the head, for a purpose similar to that of the openings $e$ and $f$. The cutting edges of the tools $g$ and $k$ may be adjusted in the tubular opening $b$ by means of the screws $g''$ and $k''$, which bear against the end of the tools similarly to the two screws $c''$ and $d''$. The cutting-edge of the tool $g$ projects into the tubular opening $b$ in front of the tool $k$, the cutting-edge of which is situate farther down the opening $b$, the distance between the cutting-edges to the two tools being equal to the length of the pin to be cut on the male sucker-joint. The tool $g$ is adjusted by means of the screw $g''$, so that the cutting edge shall project in the opening $b$ sufficiently to finish the pin and the shoulder at the base of the pin on the male sucker-rod joints, while the tool $k$ should be so adjusted that the cutting-edge will extend to the center of the opening $b$, so as to face the end of the male joint. In cutting the female joint, however, the tool $g$ is adjusted so that the cutting-edge of the same shall extend to the center of the opening $b$ and face the end of the joint in the same manner as the tool $k$ faces the male joint. On the rear face of the head, on a line with the opening $b$, is formed or attached a hollow neck or collar, $n$, the inside of which is threaded. The head $a$ and neck $n$ may be formed of any suitable metal, while the tools or chisels are preferably formed of steel.

The operation of my device is as follows: The head $a$ is screwed onto the arbor of a lathe in lieu of the face-plate, so that the center of the opening $b$ constitutes the live center. Between the forks of the sucker-rod joint is placed a rod or short pole, which bears against the dead center of the tail-screw. The sucker-rod joint is prevented from turning by means of a wrench, $n'$, which bears against the bed of the lathe, or by any other suitable device. The end of the joint is inserted in the opening $b$ and caused to enter the same by means of the tail-screw while the head $a$ is turning on the arbor. The tools $c$ and $d$ turn or finish the collar on the joint, and in the case of the male joints the tool $g$ turns the pin and the shoulder at the base of the pin, and the tool $k$ faces the end of the pin, while in cutting female joints the tool $g$, being adjusted so that the edge shall extend to the center of the opening $b$, faces the end of the joint, and the tool $k$ does not come into operation. The turnings or cuttings pass out from the head through the openings $e$ and $f$ and $l$ and $m$. When the end of the joint reaches the tool which faces the same the motion of the lathe is stopped, the joint removed, and another put in its place.

Having thus described my invention, what I claim, and desire to secure by Letters Patent, is—

1. A chuck or lathe-head for finishing sucker-rod or similar joints, said head or chuck having a central axial cavity and provided with a series of inwardly-projecting cutters, the outer cutters of the series being arranged in the same plane and adapted to finish or turn the collars, and the cutting-edges of the inner cutters of the series being arranged in different planes, one of said inner cutters being adjustable to and from the center of the cavity, whereby the same tool is adapted to finish either or both the pin and socket sections of a sucker-rod or similar joint, substantially as specified.

2. In a chuck for finishing sucker-rod or similar joints, the combination, with a head, $a$, having an axial cavity and slotted as at $e f l m$, of a series of inwardly-projecting adjustable knives or cutters, $c d g k$, relatively arranged with relation to each other and their respective slots $e f l m$, substantially as and for the purpose specified.

In testimony whereof I have hereunto set my hand.

JOHN CAIN.

Witnesses:
R. H. WHITTLESEY,
J. K. BAKEWELL.